United States Patent [19]

Horigome et al.

[11] Patent Number: 5,330,880
[45] Date of Patent: Jul. 19, 1994

[54] PROCESS FOR PRODUCING OPTICAL DISKS

[75] Inventors: Shinkichi Horigome, Tachikawa; Yoshinori Miyamura, Tokyo; Yumiko Anzai, Tachikawa; Keizo Kato; Hiroshi Shiraishi, both of Hachioji, all of Japan

[73] Assignee: Hitachi, Ltd., Tokyo, Japan

[21] Appl. No.: 936,293

[22] Filed: Aug. 28, 1992

[30] Foreign Application Priority Data

Sep. 3, 1991 [JP] Japan ............... 3-222692

[51] Int. Cl.$^5$ .............................. G11B 7/26
[52] U.S. Cl. ........................ 430/321; 430/320; 264/1.4; 264/107
[58] Field of Search ........... 430/321, 320, 945; 346/135.1, 137; 369/84, 285; 264/1.4, 106, 107

[56] References Cited

U.S. PATENT DOCUMENTS

| | | | |
|---|---|---|---|
| 4,354,988 | 10/1982 | Bricot et al. | 264/22 |
| 4,724,043 | 2/1988 | Bergendahl et al. | 156/643 |
| 4,778,747 | 10/1988 | Ohta et al. | 430/321 |
| 5,087,535 | 2/1992 | Hirokane et al. | 430/5 |
| 5,147,763 | 9/1992 | Kamitakahara | 430/320 |

FOREIGN PATENT DOCUMENTS

| | | |
|---|---|---|
| 0176684 | 4/1986 | European Pat. Off. |
| 0319350 | 6/1989 | European Pat. Off. |
| 0355925 | 2/1990 | European Pat. Off. |
| 0405898 | 1/1991 | European Pat. Off. |
| 56-51031 | 5/1981 | Japan |
| 56-87203 | 7/1981 | Japan |
| 57-50304 | 3/1982 | Japan |
| 59-224320 | 12/1984 | Japan |
| 63-153745 | 6/1988 | Japan |
| 1-48246 | 2/1989 | Japan |
| 1-115621 | 5/1989 | Japan |
| 2-44540 | 2/1990 | Japan |
| 3-46894 | 7/1991 | Japan |

OTHER PUBLICATIONS

Patent Abstracts of Japan, vol. 13, No. 590, Dec. 1989, English Language Abstract of JP 1-251451 (Oct. 1989), Masahiro et al.
Patent Abstracts of Japan, vol. 9, No. 100, May 1985, English Language Abstract of JP 59-224320 (Dec. 1984), Yasuki.
Patent Abstracts of Japan, vol. 13, No. 502, Nov. 1989, English Language Abstract of JP 1-201842 (Aug. 1989), Hideo et al.

*Primary Examiner*—Charles L. Bowers, Jr.
*Assistant Examiner*—John A. McPherson
*Attorney, Agent, or Firm*—Antonelli, Terry, Stout & Kraus

[57] ABSTRACT

In a process for producing optical disks comprising the steps of subjecting the photoresist layer on a substrate formed of silicon, quartz, glass or a metal to light exposure, developing and etching treatments to obtain a stamper and then duplicating an information pattern for an optical disk from the stamper obtained above to a transparent substrate by using a UV curable resin to prepare a replicated substrate of an optical disk, a large number of stampers can be prepared in a short time by conducting the light exposure either by contacting the mask side surface of a substrate provided with a photomask having an information pattern for an optical disk to the photoresist side surface of said substrate having the photoresist layer or by noncontact projection, and a rapid replication of large quantities of replicated substrates becomes possible by using a large number of stampers thus prepared.

12 Claims, 4 Drawing Sheets

FIG. 2D   REVERSAL BAKING

PROCESS FOR PRODUCING OPTICAL DISKS

BACKGROUND OF THE INVENTION

The present invention relates to a process for producing read only type optical disks, such as CD-ROM, and also write once type and rewritable type optical disks. In more particular, it relates to a process for producing optical disks excellent in attaining the speedup of replication process.

Optical disks may be roughly divided into read only type ones and writable ones. The former include laser disks (LD) and compact disks (CD) and are currently produced on a large scale. Read only type optical disks include, besides those mentioned above, CD-ROM, CD-I, DV-I and the like as multimedia means, and these are expected to grow greatly in the future. In particular, great expectation is harbored toward the use of optical disks as electronic publishing. As to the dimension of optical disks, small-sized disks 5 to 1 inch in diameter are becoming the mainstream. In the replication of such disks on a large scale, the electroplating process and the injection process, which constitute the mainstream of the processes for producing conventional LD and CD, have their limits in production speed.

In the prior art process, firstly, too much time is necessary because the stampers used are prepared by the electroplating process using nickel. Further, preparation of a large number of nickel stampers, which needs the application of electroplating process for each individual stamper, requires a still longer time. That is, it takes a long time from the receipt of the original tape to the completion of stampers, so that the process can hardly meet the requirement for a short delivery time as in electronic publishing. On the other hand, the injection method, used as a replication process, requires about 10 seconds per a disk and cannot be called a rapid replication. In this process, molten resin is filled in a mold provided with a nickel stamper at high temperature and high pressure, then cooled and taken out. A time of about 10 seconds is necessary to cool the resin at 330°-350° down to about 80° C. In the case of CD-ROM, a reflecting layer of aluminum and the like is formed subsequently to the replication process, but the film-forming process is of a sufficiently high speed in itself. Therefore, the replication process is rate-determining in the whole production process.

Inventions regarding the speedup of a replication process include those disclosed in Japanese Patent Kokai (Laid-open) Nos. 1-115621 and 2-44540. The disclosed methods comprise pressing a nickel stamper having a surface unevenness pattern of information against the surface of a previously heated resin sheet to effect replication. They, however, are said to have a problem in the replicability of minute patterns of submicron order and, when the trend toward more minute patterns in future is taken into consideration, cannot be said an excellent process. As to the inventions regarding rapid replication based on a replication method using UV curable resins, namely so-called 2P (photo-polymerization) method, mention may be made of those disclosed in Japanese Patent Kokai (Laid-open) Nos. 56-51031, 56-87203, 57-50304, 63-153745 and 64-48246. The methods disclosed in these comprise coating a UV curable resin on a continuously moving transparent resin sheet, irradiating an ultraviolet light through the sheet to cure the UV curable resin while pressing a stamper against the sheet, then peeling the UV cured resin off the stamper to complete replication, thereafter forming a light reflecting layer and a protective layer and finally punching the sheet into the form of disk. These disclosed methods include one which uses a flat stamper, one which sticks one or more stampers onto the surface of a drum and rotates the drum as in a rotary press, or further one which uses plural stampers to permit a number of replications by one time irradiation. These disclosures, however, either describe nothing of the detail of the stampers to be used or only describe the use of nickel stampers prepared by conventional methods. When nickel stampers are made by conventional methods, a large number of stampers cannot be prepared in a short time and hence a large quantity of optical disks cannot be produced in a short period of time.

As to the inventions regarding stampers, on the other hand, those disclosed in Japanese Patent Kokai (Laid-open) No. 59-224320 and Japanese Patent Kokoku (Post-Exam. Publication) No. 3-46894 can be referred to. The disclosed methods comprise irradiating laser beams light-modulated according to the information to be recorded onto a photoresist layer formed on a silicon substrate (this process being called "cutting process"), followed by developing and etching to form a surface unevenness pattern, and using the resulting product as a stamper. In this case also, the preparation of a large number of stampers requires too much time because each stamper requires a cutting process each time for its preparation. That is, though the time efficiency is improved in the method because of the disuse of an electroplating process, the method requires, each time a stamper is produced, a cutting process which takes 60-30 minutes per one time. In this method, further, the shape and dimension of raised or sunken pits on the stamper formed, which represent the information, are apt to fluctuate among individual stampers. In the prior method, therefore, among the original molds obtained by patterning through the cutting process, only those which have passed strict inspection are to be used in the next process; this makes it difficult to prepare a large number of stampers by such methods. There is also known a method which prepares a nickel stamper directly in a short time by means of ion milling. This method, however, produces a stamper of a sunken pattern wherein the sunken parts and the raised parts of the pattern are reversed. When such a stamper is used to replicate optical disks by the above-mentioned injection method, minute patterns can be difficultly replicated, resulting in a large proportion of defective products.

SUMMARY OF THE INVENTION

The object of the present invention is to provide a process for producing optical disks in a large quantity and in a short time overcoming the difficulties of the prior methods mentioned above.

According to the first aspect of the present invention, there is provided a process for producing optical disks comprising the steps of subjecting a photoresist layer on a substrate formed of silicon, quartz, glass or a metal to light exposure, developing and etching treatments to obtain a stamper and then duplicating an information pattern for an optical disk from the stamper obtained above to a transparent plastic substrate by using a UV curable resin to obtain a replicated substrate of an optical disk, wherein the light exposure is conducted either by contacting the mask side surface of a photomask provided with a nontransparent mask having an information pattern for an optical disk to the photoresist side surface of said substrate having the photoresist layer or by noncontact projection.

In this case, stamper is obtained wherein the signal part is of a sunken pattern.

As the photoresist, a positive photoresist may be used which is a mixture of naphthoquinonediazide and phenol resin. The metal used as the material of the stamper may be nickel, copper, chromium, cobalt, titanium and the like. The UV curable resin used may be a mixture of a mono-, di-, tri- or tetra-acrylic ester with a photoinitiator. Examples of the acrylic esters preferably used include 2-ethylhexylacrylate, ethylacrylate, phenylacrylate, 2-ethoxyethylacrylate, octadecylacrylate, 1,4-butanedioldiacrylate, tripropyleneglycoldiacrylate, trimethylolpropanetriacrylate, and the like. Examples of the preferred photoinitiators include benzophenone, acetophenone, benzil, benzoin, and the like.

According to the second aspect of the present invention, there is provided a process for producing optical disks comprising the steps of subjecting the photoresist layer on a substrate formed of silicon, quartz, glass or a metal to light exposure, developing and etching treatments to obtain a stamper and then duplicating an information pattern for an optical disk from the stamper obtained above to a transparent plastic substrate by using a UV curable resin to prepare a replicated substrate of an optical disk, wherein the light exposure is conducted either by contacting the mask side surface of a photomask provided with a nontransparent mask having an information pattern for an optical disk to the photoresist side of said substrate having the photoresist layer or by noncontact projection, the photoresist layer of non-irradiated regions is removed by the developing and the substrate surface provided thereunder is etched to give a raised pattern stamper having an information pattern for an optical disk.

The photoresists preferably used to prepare the raised pattern stamper are positive photoresists for image reversal or negative photoresists. The term "raised pattern stamper" means a stamper wherein the signal part is of a raised pattern. The positive photoresist for image reversal used herein may be the same material as the positive photoresist mentioned above. When the photoresist, after light exposure, is subjected to reversal baking for image reversal, then to whole surface uniform exposure and further to developing, the photoresist of light-irradiated parts is left behind just as in negative photoresist. Examples of the negative photoresist which may be used include cyclorubber incorporated with an aromatic bisazide and polymethylisopropenylketone incorporated with a bisazide.

The etching of silicon, quartz, glass or metals can be performed by using wet etching, reactive ion etching, or ion milling. Side etching by means of wet etching has some difficulties in forming submicron patterns. As contrasted, the reactive ion etching, which uses $CF_4$, $CHF_3$, or the like as the reactive gas, is of high resolution and is preferable for etching silicon, quartz, glass and the like. For the etching of metals as nickel, chromium and the like, the ion milling in which accelerating Ar ions are irradiated is preferred.

A plurality of stampers obtained by repeating the light exposure, developing and etching treatments mentioned above are fixed to a holder, whereby a plurality of replicated substrates can be prepared by conducting the duplication process only once.

The holder is formed of a metal such as aluminum, plastic or ceramic and has a flat face onto which the stamper can be fixed with an adhesive or the like.

The above-mentioned duplication process preferably comprises the steps of placing a liquid UV curable resin in a convex form on a transparent plastic sheet moving continuously or intermittently, pressing the above-mentioned holder onto the resin, then irradiating ultraviolet light to cure the resin, and subsequently peeling the sheet off the stamper.

The transparent plastic sheet may be those of polycarbonate, polymethylmethacrylate, polyvinylchloride, polyolefin, polyethyleneterephthalate, and the like.

In a preferred method, at least three holders described above are used, the holders are pressed against the UV curable resin, and the ultraviolet light irradiation and the peeling of the resin from the stamper are conducted continuously. In another preferred method, a holder having a polyhedron to respective faces of which plural stampers have been fixed is used.

The surface of the stamper formed of silicon, quartz, glass or a metal is preferably treated with at least one stamper releasing agent or lubricant selected from fluorine-containing organic compounds and silicon-containing organic compounds to facilitate the peeling of the replicated substrate off the stamper.

The nontransparent film described above is preferably obtained by laminating chromium, tantalum, molybdenum, nickel, platinum, or the like on a transparent substrate, such as a glass substrate and the like, through sputtering or vapor deposition. Particularly preferred as the nontransparent film used in the present invention are chromium film and tantalum film from the viewpoint of hardness necessary for contact light exposure.

The process for producing optical disks usually comprises, subsequently to the step of preparing a replicated substrate, the steps of successively forming a light reflecting layer or an optical recording layer and a protective layer. The light reflecting layer may be a layer of such metals as aluminum, gold, silver, platinum, and the like. As to the optical recording layer, the write once recording layer may be those based on Te or based on dyes, and the rewritable recording layer may be those of chalcogenide-based phase change recording material and TeFeCo-based magneto-optical recording material. The protective layer may be a layer of the UV curable resin mentioned above or a plastic sheet of several ten $\mu m$ thickness.

The present invention is described in more detail below with reference to the drawings.

Figure 1A:
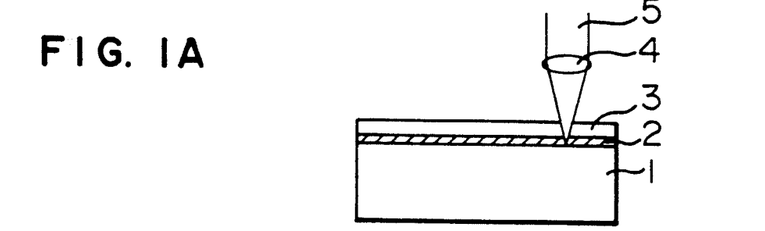
FIGS. 1A to 1E show a sequence of operations for illustrating the process according to the first aspect of the present invention up to the preparation of a stamper.
Figure 1B:
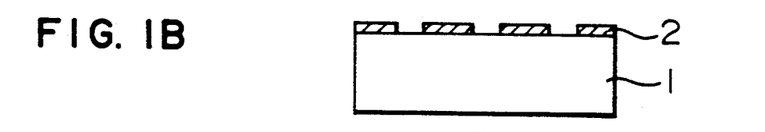
Figure 1C:
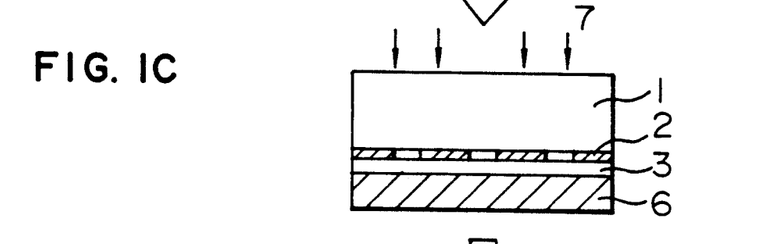
Figure 1D:
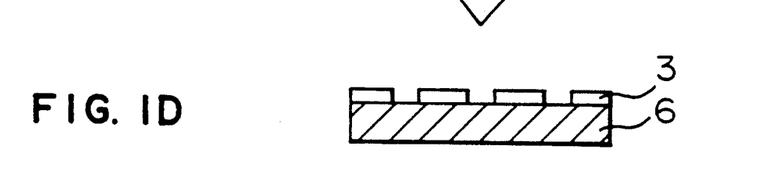
Figure 1E:
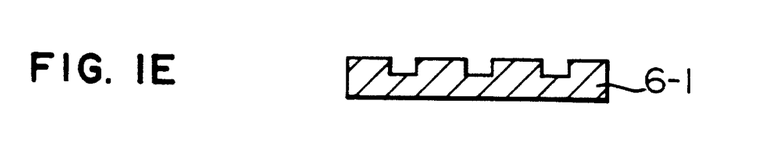

As shown in FIG. 1A, a photoresist 3 is coated on a glass substrate 1 having a chromium film 2, and laser light 5 corresponding to information is converged with a lens 4 and irradiated to the resist by using a cutting apparatus. Then, developing and etching are conducted to obtain a photomask having an information pattern as shown in FIG. 1B. The use of a photomask has the advantage of permitting to mend defective parts. Then, positive photoresist 3 is coated on a mirror-polished silicon wafer, quartz, glass or metal substrate 6. As shown in FIG. 1C the photomask is contacted thereonto and light exposure and developing are conducted to form a pattern on the photoresist as shown in FIG. 1D. Then dry etching is performed to obtain a stamper 6-1 having a sunken pattern as shown in FIG. 1E. The characteristic feature of this method lies in that once one photomask has been prepared by cutting, a large number of sunken pattern stampers can be readily produced thereafter in a short time. In place of the contact light exposure shown in FIG. 1C, reduction projection exposure, Which is conducted keeping the photomask apart from the photoresist layer, may also be used.

Figure 2A:
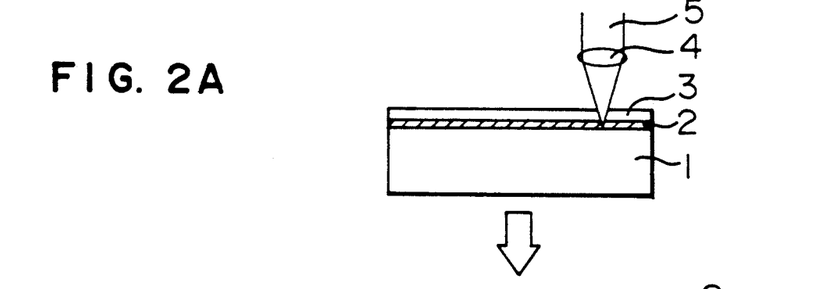
FIGS. 2A to 2F show another sequence of operations for illustrating the process according to the second aspect of the present invention up to the preparation of a stamper.
Figure 2B:
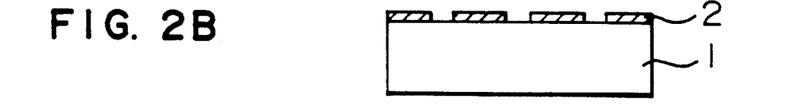
Figure 2C:
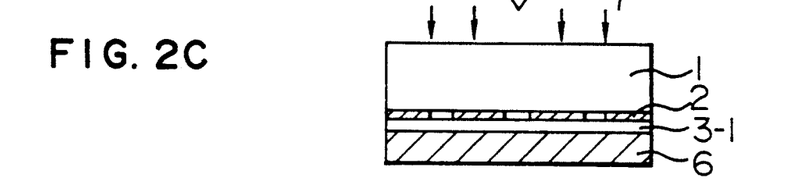
Figure 2D:
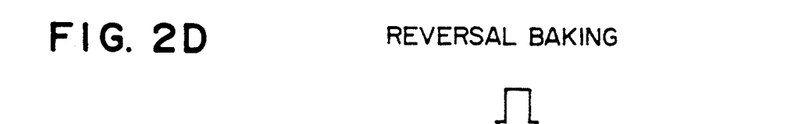
Figure 2E:
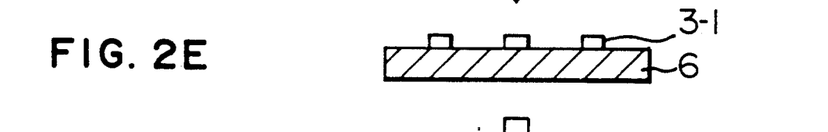
Figure 2F:
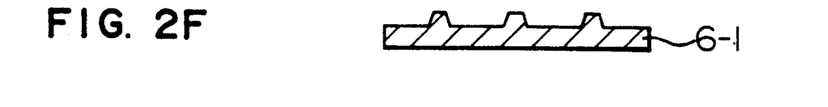

On the other hand, a pattern in which the photoresist of the irradiated parts remains behind like in negative photoresist as shown in FIG. 2E can be obtained by using positive photoresist for image reversal 3-1 as the photoresist and conducting the processes of FIGS. 2A and 2B and the contact light exposure of FIG. 2C, followed by the reversal baking of photoresist of FIG. 2D and then developing. After subsequent dry etching resultantly, a stamper 6-1 having a raised pattern as shown in FIG. 2F is obtained.

To facilitate the peeling of UV cured resin off the stamper, the surface of the stamper may be coated with a stamper releasing agent such as a fluorine-containing organic compound or silicon-containing organic compound, whereby processability can be improved.

The stamper releasing agent has the function of reducing the peeling force by lowering the surface energy of the stamper. Examples of fluorine-containing organic compounds and silicon-containing organic compounds having such a function which may be used include, respectively, $F(CF_2)_n-(CH_2)_2-Si(OCH_3)_3$, wherein n is 1 to 8, and $C_nH_{2n+1}Si(OCH_3)_3$, wherein n is 8 to 18.

The polished surfaces of silicon, quartz and glass have a low degree of roughness and have the merit of giving a noise lower by 10–15 dB as compared with the polished surface of metals when used as optical disks. Among metal substrates, however, a nickel plate prepared on a photoresist layer surface by means of sputtering and electroplating of nickel without polishing has a surface which gives a sufficiently low noise, and can be used as the substrate for a stamper in the present invention. It is needless to say that the nickel stamper thus obtained can also be used for the conventional injection method.

Figure 3A:
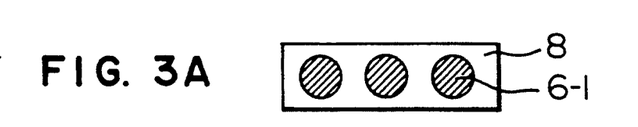
FIGS. 3A and 3B show, respectively, a plan view A and a sectional view B of a holder having fixed thereto stampers obtained by the process for preparing stampers according to the present invention.
Figure 3B:
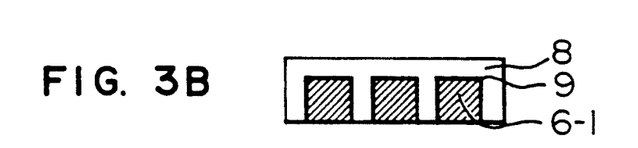
Figure 4:
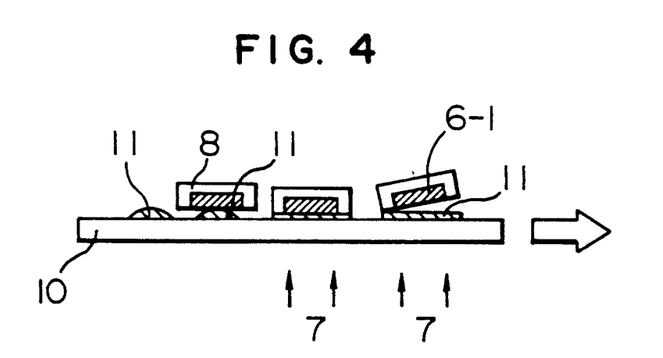
FIG. 4 is a schematic view showing one example of the process for preparing replicated substrates according to the present invention.
Figure 5:
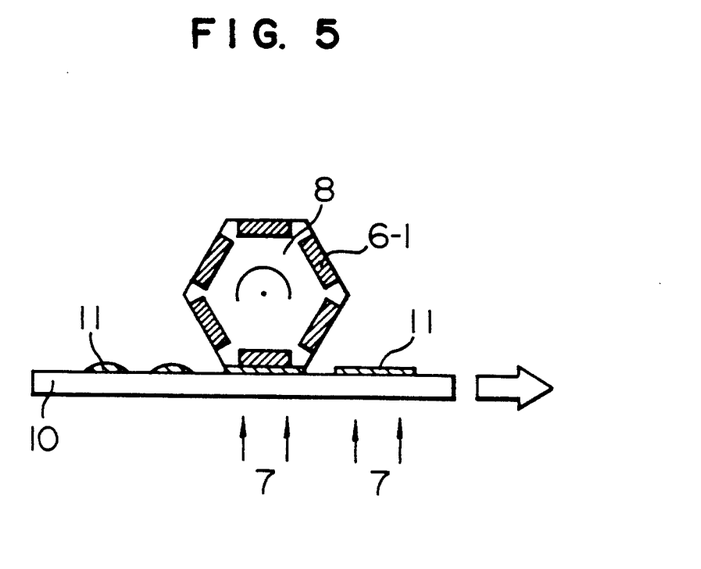
FIG. 5 is a schematic view showing another example of the process for preparing replicated substrates according to the present invention.

Nextly, as shown in FIG. 3, plural stampers are fixed to a holder 8. Liquid UV curable resin 11 is placed on a transparent plastic sheet 10 of polycarbonate or the like, a stamper is pressed thereonto, and ultraviolet light is irradiated to cure the resin. This 2P process is excellent in duplicability. A number of replicas corresponding to the number of stampers set to the holder can be obtained by conducting the duplication process once. Further, more rapid duplication is possible by providing 3 or more holders to each of which plural stampers have been fixed as shown in FIG. 4. Rapid duplication is also made possible by using a drum type polyhedral holder to each face of which at least one stamper has been fixed and rotating the holder in keeping with the move of the transparent plastic sheet.

In the preparation of stampers which use as the substrate a silicon wafer, quartz, glass or metal substrate, a large number of stampers can be prepared in a shorter time by applying lithography, wherein positive photoresist is used, the photoresist of the irradiated region is removed, and the substrate surface placed thereunder is etched. In this case, once one photomask is prepared by means of cutting, thereafter a large number of stampers can readily be produced in a short time. Accordingly, by setting plural stampers thus obtained to a holder and applying one time of ultraviolet irradiation using UV curable resin while moving the transparent plastic sheet continuously, followed by a peeling process, the preparation of plural replicated substrates is made possible and the speedup of replication process can be attained.

A raised pattern stamper can be prepared when a positive photoresist for image reversal or a negative photoresist is used.

DETAILED DESCRIPTION OF PREFERRED EMBODIMENTS

EXAMPLE 1

A positive photoresist AZ-1350 was spin-coated in a thickness of 0.2 μm on a glass substrate coated with Cr layer for use in semiconductors and baked at 80° C. for 1 hour. The Cr layer had a thickness of about 0.1 μm. The positive photoresist used was TS MRV5 mfd. by Tokyo Oka K.K.. Then, with a cutting apparatus provided with an Ar ion laser, laser light 5 was converged by means of a lens 4 as shown in FIG. 1A and irradiated in pulses corresponding to information to be recorded to form a latent image in the photoresist layer. Developing was conducted by using a developer, NMD-3, mfd. by Tokyo Oka K.K. at a developer concentration adjusted to 2.38% for 1 minute. Resultantly, the photoresist of the light-exposed parts was removed and thus patterning was completed.

The resulting product was post-baked at 100° C. for 30 minutes and the chromium layer was etched by treating with a milling apparatus using Ar ions. (The etching of the chromium layer could also be accomplished by wet etching using an aqueous cerium (IV) ammonium nitrate solution (Mixed Acid S-2N, mfd. by Kanto Kagaku). The etching was conducted at an Ar pressure of about $3 \times 10^{-2}$ Pa and an accelerating voltage of 600 V. The etching velocity was 0.013 μm/min. Then, the remaining photoresist was removed by oxygen ashing. Thus, a chromium mask (photomask) having an information pattern was obtained. The information pattern was made to be recorded within a diameter of 3.0 inches.

Separately, a positive photoresist AZ-1350 was coated in a thickness of 0.2 μm on the surface of a disk-shaped silicon wafer 3.5 inches in diameter and 0.4 mm in thickness, and then baked at 80° C. for 1 hour. Then, as shown in FIG. 1C, the photomask obtained above and the silicon wafer were contacted to each other and exposed with a light of a high pressure mercury-arc lamp.

Then the resulting system was subjected to developing and post baking, and the surface of the silicon wafer was etched with a reactive ion etching apparatus (RIE) using $CF_4$ as the reactive gas. (The silicon wafer surface could also be etched by means of an Ar ion beam. Wet etching, however, resulted in side etching and could not yield desired sunken pits.) The apparatus used was of a parallel plate type and a frequency of 13.56 MHz was used. At a gas pressure of 5Pa and a power of 400 W, the etching rate was 0.032 $\mu$m/min. The etching conditions were adjusted so as to give sunken parts of 0.14 $\mu$m depth on the silicon surface. Then the remaining photoresist was removed by oxygen ashing to obtain a silicon stamper. Though 3 silicon wafers per batch were treated in this experiment, a larger number of stampers can be treated when the disk is of a smaller size.

Then, to facilitate the peeling of the silicon wafer off the UV cured resin, the silicon surface was treated with a fluorine-containing organic compound to lower the surface energy. Specifically, a solution of $F(CF_2)_8-(CH_2)_2-Si(OCH_3)_3$ was spin-coated or evaporated to cover the silicon surface with the molecules of the compound and then the surface was heat-treated at 100° C. for 10 minutes. As the result of the above heat treatment, it was confirmed that the silicon surface came to have a contact angle to water of about 110°, showing a lowered surface energy, and the peeling force from the UV cured resin was reduced to about one third to one fifth of that of the untreated stamper. Since the fluorine-containing organic compound is chemically bonded to the silicon surface, it will not split off in the duplication process. In the treatment with a fluorine-containing organic compound, however, the amount of the compound attached must be controlled accurately so that the surface unevenness pattern of information may not be filled up.. Besides the above-mentioned compound, fluorine-containing coating agents and siloxanes available on the market gave similar effects.

Three silicon stampers thus obtained were fixed to an aluminum holder as shown in FIG. 3. A rapid curable epoxy adhesive 9 was used for fixing. As shown in FIG. 4, a polycarbonate sheet 10 of 1.2 mm thickness was withdrawn from a roll (not shown in the Figure). The sheet was 300 mm in width and showed a retardation (namely, birefringence) of 60 nm or less in double path. Liquid UV curable resin 11 was applied dropwise in a convex form onto the sheet, and the holder 8 having fixed stampers was pressed thereonto.

Figure 6:
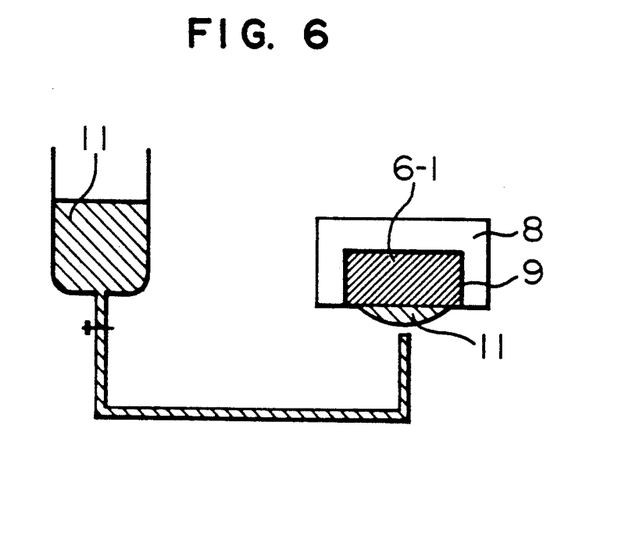
FIG. 6 is a schematic view showing one example of a method of feeding UV curable resin used in the present invention.

The UV curable resin used was a mixture of 50% by weight of 1,4-butanedioldiacrylate and 50% by weight of trimethylolpropanetriacrylate, incorporated with 2% by weight of benzophenone as a photoinitiator. The dropwise application of the resin in a convex form was adopted with the intention of bringing the UV curable resin in point contact with the stamper to avoid entrapping of bubbles. Alternatively, when the UV curable resin is supplied to the under surface of the stamper as shown in FIG. 6, the liquid resin assumes a form convex towards below, and also in this case, bubbles are hardly entrapped when the resin comes in contact with the transparent plastic sheet.

After the UV curable resin had been spread over the whole surface of the stamper, ultraviolet light 7 was irradiated thereto for one second from the sheet side with a high voltage mercury-arc lamp. The output of the high voltage mercury-arc lamp was 80 W/cm. The curing speed depends on the photosensitivity of the UV curable resin and the intensity of the light source. The higher the curing speed is, the more rapid duplication becomes possible. The UV cured resin layer obtained had a thickness of about 20 $\mu$m. The UV cured resin layer was then peeled off the stamper.

When only one holder is used, as described above, the next pressing of the liquid UV curable resin can be done only after finishing the above-mentioned peeling, and hence it is necessary to wait for a certain time until the UV curable resin spreads over the stamper again. Accordingly, the speed of the duplication process for obtaining replicated substrates is lowered to that extent. To shorten the waiting time, as shown in FIG. 4, three holders were provided on each of which plural stampers were arranged in a row, and were operated such that one is at the step of spreading the UV curable resin, another is at the step of ultraviolet light irradiation and the third is at the peeling step, whereby more rapid replication became possible. When curing was insufficient with one second of ultraviolet light irradiation, provision was made such that ultra-violet light could be irradiated also after the finish of peeling. This is based on the idea that even when curing is insufficient it is allowable if the cure has proceeded to such an extent that the surface unevenness pattern duplicated from the stamper does not undergo deformation, and the remainder of the cure is to be accomplished by later irradiation. The speed of the duplication process for replicated substrates can be further increased when the stampers on the holder are arranged not in one row as shown in FIG. 3A but in plural rows. The polycarbonate sheet may be moved not only at a constant speed but also intermittently, that is, it may be stopped for a certain time and then moved at a high speed.

On the polycarbonate sheet onto which an information pattern had been duplicated was formed as a reflecting layer an aluminum layer to a thickness of about 70 nm by means of sputtering at about $1 \times 10^{-4}$ Pa. In this case also, the sheet was passed continuously through the sputtering apparatus. Then, optical disks of 3.0 inch size were punched out while detecting the center of each duplicated pattern by an optical technique. A protective layer was formed thereon by using the same UV curable resin as used in the duplication (similar products were obtained also when the punching was conducted after the protective layer had been formed).

The CD-ROM thus obtained showed a C/N ratio, electric signal characteristic thereof, of 55-60 dB, which is comparable with that of prior CD. In the case of a write once type optical disk or a rewritable type optical disk, about 25 nm of a $Te_{80}Se_{20}$ write once type recording layer, about 30 nm of a $Ge_{21}Sb_{26}Te_{53}$ phase change recording layer or about 30 nm of a $Tb_{24}Fe_{62}Co_{14}$ magneto-optical recording layer was laminated by sputtering at about $1 \times 10^{-4}$ Pa in place of the Al reflecting layer, and the resulting disks were evaluated. They all gave a C/N ratio of 55-60 dB, confirming that they were optical disks of high quality.

EXAMPLE 2

Contact light exposure was conducted in the same manner as in Example 1 except for using AZ 5200 IR (positive image reversal photoresist, mfd. by Hoechst) in place of the positive photoresist used in Example 1, and then reversal baking for image reversal (120° C., 5 minutes), whole surface uniform exposure and developing were conducted successively. As a result, just as in negative photoresist, a pattern was obtained in which the photoresist of the light-irradiated parts had been left behind. Then the system was post-baked and the silicon surface was etched by means of a reactive ion etching apparatus (RIE) using $CF_4$ as the reactive gas so as to give raised parts of 0.14 μm height. Then, the remaining photoresist was removed by oxygen ashing to obtain a silicon stamper. Though three silicon wafers per batch were treated in this experiment, a larger number of stampers can be treated when the disk are of a smaller size.

Then, in the same manner as in Example 1, the silicon surface was treated with a releasing agent, information pattern was duplicated by using UV curable resin, and an aluminum layer was formed as a reflecting layer to a thickness of about 70 nm by means of sputtering at about $1 \times 10^{-4}$ Pa on the polycarbonate sheet onto which an information pattern had been duplicated. In this case also, the sheet was passed continuously through the sputtering apparatus. Then, optical disks of 3.0 inch size were punched out while detecting the center of each duplicated pattern by optical means. A UV cured resin layer was formed thereon as a protective layer. (The punching could also be conducted after the protective layer had been formed).

The CD-ROM thus obtained showed a C/N ratio, an electric signal characteristic thereof, of 55–60 dB, which is comparable with that of prior CD. Further, in place of the aluminum reflecting layer, about 25 nm of a $Te_{80}Se_{20}$ write once type recording layer, about 30 nm of a $Ge_{21}Sb_{26}Te_{53}$ phase change recording layer or about 30 nm of a $Tb_{24}Fe_{62}Co_{14}$ magneto-optical recording layer was laminated by sputtering at about $1 \times 10^{-4}$ Pa and the resulting disks were evaluated. All the disks gave a C/N ratio of 55–60 dB, confirming that they were optical disks of high quality.

When a negative photoresist was used in place of the positive photoresist for image reversal, the resulting optical disk showed a poor resolution and its C/N ratio could not be determined.

EXAMPLE 3

In the same manner as in Example 1 except that a quartz substrate 3.5 inches in diameter and 1 mm in thickness having a mirror-polished surface was used in place of the silicon wafer used in Examples 1 or 2 and the quartz surface was etched by means of a reactive ion etching using $CF_4$ as the reactive gas, a CD-ROM was punched out. The CD-ROM thus obtained gave a C/N ratio of 55–60 dB, a good electric signal characteristic.

EXAMPLE 4

A nickel plate was used in this Example in place of the silicon wafer used in Example 1 or Example 2.

Photoresist was coated in a thickness of 0.2 μm on a glass disk 5 inches in diameter and 5 mm in thickness and baked at 80° C. for 1 hour. A nickel layer 60 nm in thickness was formed by sputtering on the surface of the photoresist coated above, and a nickel layer 0.2–0.5 mm in thickness was formed by electroplating using the sputtered nickel layer as an electrode. The resulting laminate was peeled apart at the interface of the photoresist layer and the glass disk, whereby a nickel plate having a smooth flat surface was obtained. When the nickel plate is thin, the flatness of the nickel plate is apt to deteriorate in the peeling, so that peeling at the interface of the photoresist layer and the glass disk was conducted after sticking a flat backing plate of, for example, iron or the like with an adhesive. The nickel plate was worked along its periphery so as to have a diameter of 3.5 inches.

A nickel stamper was prepared by using the nickel plate in place of the silicon wafer of Example 1. The etching of nickel was conducted by Ar ion beam etching. If a large number of nickel disks as described above are prepared beforehand, a large number of replicated substrates can be prepared in a short time as in Example 1.

The nickel stamper thus obtained was set to a holder, then a replicated substrate was prepared by using the stamper, an aluminum layer and a protective layer were formed successively thereon, and finally a CD-ROM of 3.0 inches was punched out. The CD-ROM obtained gave a C/N ratio, an electric signal characteristic thereof, of 55–60 dB, which was equal or superior to that of prior CD.

According to the present invention, a large number of sunken pattern stampers or raised pattern stampers can be prepared in a short time by using silicon, quartz, glass or metals as the stamper material and through lithographic techniques as light exposure, dry etching and the like. Accordingly, a large number of replicated substrates can be produced in a short time by conducting high speed duplication through the 2P method using the large number of stampers obtained above.

Thus, according to the present invention, large quantities of optical disks can be produced within a short time from the receipt of the original tape.

What is claimed is:

1. A process for producing optical disks comprising the steps of subjecting a photoresist layer on a substrate formed of silicon quartz, glass or a metal to light exposure, developing and etching treatments to obtain a stamper and then duplicating an information pattern for an optical disk from the stamper to a transparent plastic substrate by using a UV curable resin to prepare a replicated substrate of an optical disk, wherein the light exposure is conducted either by contacting a mask side surface of a photomask provided with a nontransparent mask having an information pattern for an optical disk to the photoresist side surface of said substrate having the photoresist layer or by noncontact projection, wherein plural stampers obtained by repeating the treatments of light exposure, developing and etching are fixed to a holder and plural replicated substrates are prepared by conducting a duplication process with said holder, wherein the duplication process comprises the steps of placing the UV curable resin in a convex form on a transparent plastic sheet moving continuously or intermittently, pressing the holder onto the resin, irradiating ultraviolet light to cure the UV curable resin, and then peeling the sheet off the stampers, and wherein, in the duplication process, at least three of said holders are used, the holders are pressed against the UV curable resin, and the ultraviolet light irradiation and the peeling of the resin from the stampers are conducted continuously.

2. A process for producing optical disks comprising the steps of subjecting a photoresist layer on a substrate formed of silicon quartz, glass or a metal to light exposure, developing and etching treatments to obtain a stamper and then duplicating an information pattern for an optical disk from the stamper to a transparent plastic substrate by using a UV curable resin to prepare a replicated substrate of an optical disk, wherein the light exposure is conducted either by contacting a mask side surface of a photomask provided with a nontransparent mask having an information pattern for an optical disk to the photoresist side surface of said substrate having the photoresist layer or by noncontact projection, wherein plural stampers obtained by repeating the treatments of light exposure, developing and etching are fixed to a holder and plural replicated substrates are prepared by conducting a duplication process with said holder, wherein the duplication process comprises the steps of placing the UV curable resin in a convex form on a transparent plastic sheet moving continuously or intermittently, pressing the holder onto the resin, irradiating ultraviolet light to cure the UV curable resin, and then peeling the sheet off the stampers, and wherein, in the duplication process, a holder having a polyhedron to each of the faces of which plural stampers have been fixed is used.

3. The process for producing optical disks according to any one of the claims 1 and 2, wherein the surface of the stamper formed of silicon, quartz, glass or a metal is treated with at least one stamper releasing agent or lubricant selected from fluorine-containing organic compounds and silicon-containing organic compounds before being used.

4. The process for producing optical disks according to claim 1 or claim 2, wherein the nontransparent mask is a chromium mask or a tantalum mask.

5. The process for producing optical disks according to claim 1 or claim 2, which comprises, subsequent to the step of preparing a replicated substrate, the steps of successively forming a light reflective layer or an optical recording layer and of forming a protective layer over either on of the reflecting layer or the recording layer.

6. A process for producing optical disks comprising the steps of subjecting a photoresist layer on a substrate formed of silicon quartz, glass or a metal to light exposure, developing and etching treatments to obtain a stamper and then duplicating an information pattern for an optical disk from the stamper to a transparent plastic substrate by using a UV curable resin to prepare a replicated substrate of an optical disk, wherein the light exposure is conducted either by contacting a mask side surface of a photomask provided with a nontransparent mask having an information pattern for an optical disk to the photoresist side surface of said substrate having the photoresist layer or by noncontact projection, the photoresist layer of the non-irradiated regions is removed by developing, and the substrate surface provided thereunder is etched to give a raised pattern stamper having an information pattern for an optical disk, wherein plural stampers obtained by repeating the treatments of light exposure, developing and etching are fixed to a holder and plural replicated substrates are prepared by conducting a duplication process with said holder, wherein the duplication process comprises the steps of placing the UV curable resin in a convex form on a transparent plastic sheet moving continuously or intermittently, pressing the holder onto the resin, irradiating ultraviolet light to cure the UV curable resin, and then peeling the sheet off the stampers, and wherein, in the duplication process, at least three of said holders are used, the holders are pressed against the UV curable resin, and the ultraviolet light irradiation and the peeling of the resin from the stampers are conducted continuously.

7. A process for producing optical disks comprising the steps of subjecting a photoresist layer on a substrate formed of silicon quartz, glass or a metal to light exposure, developing and etching treatments to obtain a stamper and then duplicating an information pattern for an optical disk from the stamper to a transparent plastic substrate by using a UV curable resin to prepare a replicated substrate of an optical disk, wherein the light exposure is conducted either by contacting a mask side surface of a photomask provided with a nontransparent mask having an information pattern for an optical disk to the photoresist side of the substrate having the photoresist layer or by noncontact projection, the photoresist layer of the non-irradiated regions is removed by developing, and the substrate surface provided thereunder is etched to give a raised pattern stamper having an information pattern for an optical disk, wherein plural stampers obtained by repeating the treatments of light exposure, developing and etching are fixed to a holder and plural replicated substrates are prepared by conducting a duplication process with said holder, wherein the duplication process comprises the steps of placing the UV curable resin in a convex form on a transparent plastic sheet moving continuously or intermittently, pressing the holder onto the resin, irradiating ultraviolet light to cure the UV curable resin, and then peeling the sheet off the stampers, and wherein, in the duplication process, a holder having a polyhedron to each of the faces of which plural stampers have been fixed is used.

8. The process of producing optical disks according to any one of the claims 6 and 7, wherein the surface of the stamper formed of silicon, quartz, glass or a metal is treated with at least one stamper releasing agent or lubricant selected from fluorine-containing organic compounds and silicon-containing organic compounds before being used.

9. The process for producing optical disks according to claim 6 or 7, wherein the nontransparent mask is a chromium mask or a tantalum mask.

10. The process for producing optical disks according to claim 6 or claim 7, which comprises, subsequently to the step of preparing a replicated substrate, successively forming a light reflecting layer or an optical recording layer and of forming a protective layer over either one of the reflecting layer or the recording layer.

11. The process for producing optical disks according to claim 6 or 7, wherein a raised pattern stamper prepared by using a positive photoresist for image reversal as the photoresist is used.

12. The process for producing optical disks according to claim 6 or 7, wherein a raised pattern stamper prepared by using a negative photoresist as the photoresist is used.

* * * * *